Dec. 27, 1966     W. W. POWELL, JR     3,294,649
DESALINIZATION OF WATER
Filed Aug. 20, 1963
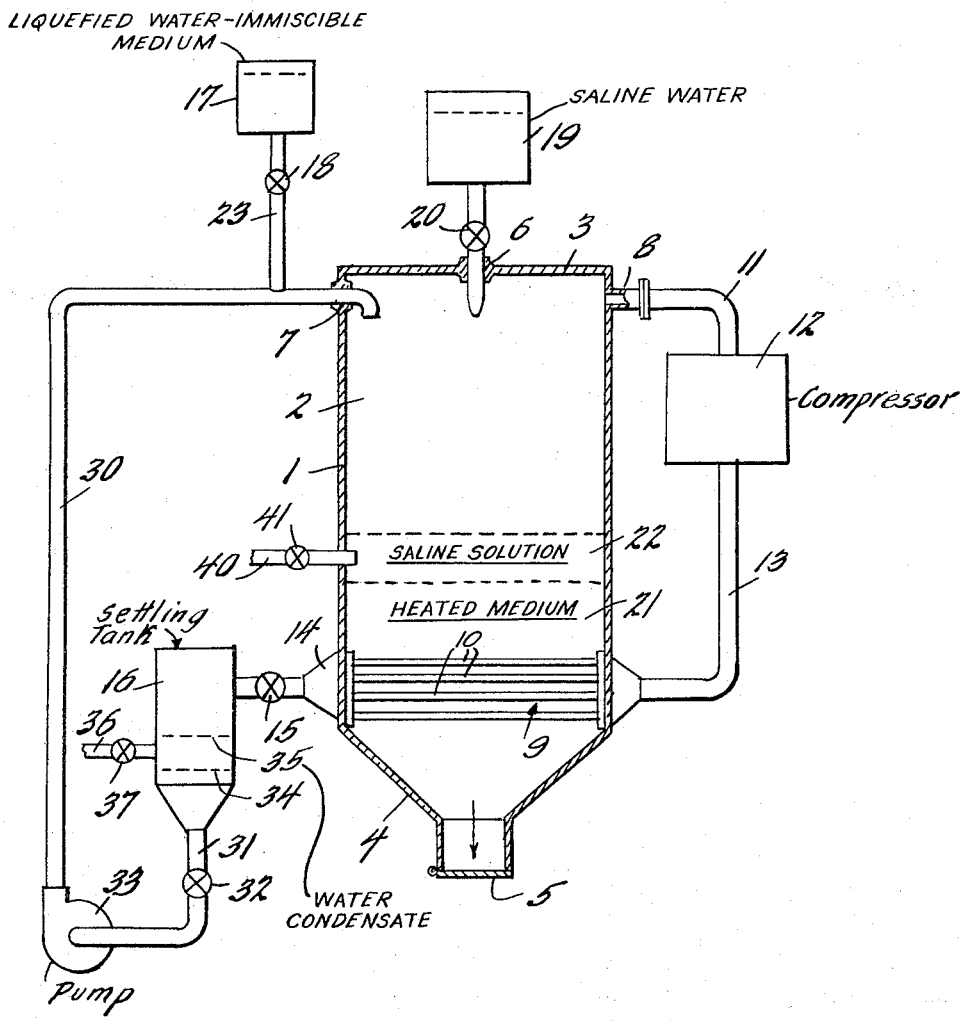
INVENTOR
*William W. Powell, Jr.*
BY *Hugo E. Weisberger*
ATTORNEY

United States Patent Office 3,294,649
Patented Dec. 27, 1966

3,294,649
DESALINIZATION OF WATER
William Ward Powell, Jr., R.F.D. 1,
Clinton, Pa. 15026
Filed Aug. 20, 1963, Ser. No. 303,245
6 Claims. (Cl. 203—10)

This invention relates to a novel method and apparatus for the desalinization of water. More particularly, the invention concerns a system for the evaporation of aqueous saline solutions to recover pure water and dissolved salts therefrom by direct heat exchange with a heat transfer medium which is in the liquid phase and capable of volatilizing at the evaporation temperature of the saline solution.

Methods have been proposed in the prior art which are based upon the principle of vaporizing water from aqueous saline solutions by direct heat exchange with water-immiscible nonvolatile molten materials, particularly molten metals such as lead, tin, bismuth and their alloys, or high-boiling molten organic substances such as paraffin wax. In these methods, heat is supplied to the saline solution from a pool of molten metal which is heated to the desired evaporation temperature by heating means external to the evaporating chamber, to which the molten metal is recirculated via a spray nozzle. This method involves continually withdrawing the nonvolatile heat transfer medium from the evaporator for the purpose of supplying heat thereto externally, and the use of a hot metal pump to recirculate the medium to the evaporator, with consequent requirements of additional energy for heating and pumping. With respect to the evaporation of the saline solution, there is involved essentially only a transfer of sensible heat from a nonvolatile liquid phase to an aqueous phase at a lower temperature, and the removal of water vapor and more concentrated brine as such from the system.

The novel desalinization method of the present invention is based upon a fundamentally different principle. Instead of a nonvolatile heat transfer medium there is employed, in accordance with the invention, a heat transfer medium which is in the liquid phase and is capable of volatilizing at the evaporation temperature selected for the aqueous saline solution, and which has limited solubility in water and in saline solutions. There is no circulation of the liquid heat transfer medium and no external heating thereof except for small amounts of the medium added at infrequent intervals for make-up purposes. The brine need not of necessity be removed as a concentrated liquid, but the evaporation of the saline solution may be carried to any desired degree, including the formation and crystallization of considerable quantities of dissolved salts, which may be removed in the form of a slurry.

In accordance with the novel method of the invention, a body of aqueous saline solution is maintained at a suitable evaporation temperature in a vaporization zone in contact with and superimposed upon a body of liquid heat transfer medium which is substantially insoluble in the saline solution, but which is maintained at and capable of volatilizing at the evaporation temperature. The vapors of water and of the heat transfer medium rise into the evaporation zone and are removed therefrom and compressed, but not liquefied, to an extent corresponding to a condensing temperature difference of about 10° F. above the boiling temperature of the saline solution, and the compressed vapors of water and heat transfer medium are then subjected to indirect heat exchange with the body of liquid heat transfer medium in the evaporation zone, thereby condensing to liquid water and liquid heat transfer medium. The condensed water and heat transfer medium are separated, and the liquid heat transfer medium is returned to the main body thereof in the evaporation zone.

In this way, in accordance with the invention, a fairly large proportion of the liquid heat transfer medium vaporizes with the water, in contrast to previously known methods in which the heat transfer medium does not vaporize at all. There is maintained within the evaporating zone, a two-layer system comprising an upper layer of saline solution and a lower layer of liquid heat transfer medium having a higher specific gravity than the saline solution. This two-layer system is maintained at the desired evaporation temperature by the energy put into the system by the vapor compressor, which constitutes the sole source of external heat energy supplied to the system, except for the small amount of incremental heat which is added with occasional quantities of make-up liquid heat transfer medium supplied as needed to maintain the body thereof in the evaporation zone. The condensation of both the water vapor and the vapors of the heat transfer medium takes place within the passages of the indirect heat exchanger used for vaporizing the liquid heat transfer medium layer within the evaporation zone, which zone suitably is provided by an evaporation chamber. The heat is transferred by the body of the liquid heat transfer medium to the body of the saline solution by direct condensation of the heat transfer medium vapors within the body of the saline solution. Water is drawn off in the separating step as a primary product and can be purified further if desired, e.g. by distillation, to remove the residual amounts of the heat transfer medium.

The method of the invention is readily adapted to the evaporation, concentration, and desalinization of aqueous saline solutions in general, whether they include one or more dissolved salts. The term saline solutions as used herein includes both brackish water and sea water. These solutions can be concentrated to any desired extent, in a continuous process, and in one or more stages.

Thus in the concentration and desalinization of sea water, which is generally acknowledged to have the approximate composition:

TABLE 1

| Salt: | Parts per million |
|---|---|
| NaCl | 27,213 |
| $MgCl_2$ | 3,807 |
| $MgSO_4$ | 1,658 |
| $CaSO_4$ | 1,260 |
| $K_2SO_4$ | 863 |
| $CaCO_3$ | 123 |
| $MgBr_2$ | 76 | the concentration can be increased in separate stages to recover individual salts in accordance with their solubilities in water which are, for example:

TABLE 2 [1]

| Salt: | Solubility (grams per 100 grams water at 100° C.) |
|---|---|
| NaCl | 39.8 |
| $MgCl_2$ | 73.0 |
| $MgSO_4$ | 73.8 |
| $CaSO_4$ | 0.16 |
| $K_2SO_4$ | 24.1 |
| $CaCO_3$ | 0.18 |
| $MgBr_2$ | 120.2 |

[1] Source: Handbook of Chem. & Physics, Chem. & Rubber Pub. Co., 41st Ed.

In evaporation of sea water, calcium sulfate and calcium carbonate both crystallize first, and 100% of these salts will separate when about 90% of the water has been removed. At that point the sodium chloride concentration is approximately 80% of saturation. The magnesium and potash salts may be recovered from sea water by selective concentration and crystallization by the method of the invention.

As the heat transfer medium for the evaporation system there is employed, in accordance with the invention, a substance which possesses the following characteristics: limited solubility in water, fairly high specific gravity which should be higher than that of the concentrated saline solution at the chosen evaporation temperature, relatively high vapor density, chemical inertness and stability, non-hydrolyzability within the evaporation and condensation temperature ranges, nontoxicity, suitable thermal conductivity characteristics, and good volatility in the liquid phase at the evaporation temperature. It has been found that these requirements are met satisfactorily by a number of halogenated organic compounds, particularly halogenated aromatic and aliphatic hydrocarbons, and mixtures thereof. Advantageously, there may be employed chlorinated hydrocarbons including the following, the properties of which are listed below:

TABLE 3 [1]

| Compound | Boiling Point,[2] °C. | Specific Gravity [3] |
| --- | --- | --- |
| Chlorobenzene | 131–132 | 1.107 |
| o-Dichlorobenzene | 180–183 | 1.307 |
| m-Dichlorobenzene | 172 | 1.288 |
| p-Dichlorobenzene | 174 | 1.458 |
| o-Chlorotoluene | 159 | 1.082 |
| m-Chlorotoluene | 162 | 1.072 |
| p-Chorotoluene | 162 | 1.070 |
| Perchloroethylene | 121 | 1.6311 |

[1] Source: Handbook of Chem. & Physics, Chem. & Rubber Publ. Co., 41st ed.
[2] All the above compounds are liquid at room temperature except p-dichlorobenzene which has M.PT. 53° C.
[3] Specific gravities are at 20°/4° except perchloroethylene which is at 15°/4° C.

The preferred substances for use in the method of the invention are p-dichlorobenzene and perchloroethylene, and the operation of the method and the apparatus will be illustrated with reference to the former.

The method and apparatus of the invention will be more readily understood by reference to the accompanying drawing which illustrates the evaporation system schematically. In the drawing there is shown in section an evaporation chamber 1, which may be a suitably insulated steel shell shaped, for example, as a cylinder. The interior of chamber 1 provides an evaporation zone 2. Chamber 1 is provided with a roof 3 and a hopper bottom 4 for collecting and removing crystallized salts via discharge opening 5. Evaporation chamber 1 is further provided with an inlet 6 for introduction of saline solution and with an inlet 7 for the introduction of heat transfer medium. Chamber 1 is further provided with vapor outlet 8 which is connected to vapor conduit 11 leading to vapor compressor 12 which compresses the vapors of water and heat transfer medium to the desired degree. The compressor 12 may be of any suitable type, such as as a piston-cylinder, a positive displacement, or centrifugal type, the latter being suitable for large scale operation. Vapor conduit 13 leads from compressor 12 to an indirect heat exchanger 9 located within the evaporation chamber and including a bank of tubes 10 within which the vapors are condensed to liquid water and liquid heat transfer medium. Connected to the tube bank is liquid discharge conduit 14 and control valve 15 located therein leading to settling tank 16 which serves for separating the two immiscible liquid phases.

Settling tank 16 is provided with a heat transfer medium return line 30 leading from the discharge opening 31 via valve 32 and pump 33 back to inlet 7. In settling tank 16, two layers are formed, layer 34 being heat transfer medium, and layer 35 supernatant, being water. Draw-off pipe 36 and valve 37 are provided for water removal. Means are provided for removal of partially evaporated saline solutions, comprising outlet pipe 40 leading from the interior of chamber 2 and located at a suitable point above heat exchanger 9 and equipped with discharge valve 41.

Separated heat transfer medium is drawn off and returned to the evaporating chamber via inlet 7. Connected to evaporating chamber 1 via inlet 7 and conduit 23 is heat transfer medium supply tank 17 equipped with control valve 18. Also connected to evaporation chamber 1 is saline solution supply tank 19 which is adapted to feed saline solution via valve 20 and inlet 6. When the system is in operation, a body of liquid heat transfer medium 21 is maintained at a level approximately as shown in the drawing, at the bottom of the chamber and at a height sufficient to surround completely tube bank 10. A body of saline solution 22 is maintained superimposed on top of heat transfer medium 21.

The operation of the evaporating system is as follows. In starting up, a charge of liquid heat transfer medium 21, such as for example molten p-dichlorobenzene, is introduced into the evaporation chamber 1 to a depth which fills the hopper and completely submerges heat exchanger tube bank 10. In the case of p-dichlorobenzene, the temperature of the heat transfer medium may be approximately 212° F. A charge of aqueous salt solution, such as sea water, also preheated to about 212° F., is introduced via inlet 6, and by reason of its lower specific gravity and limited solubility forms a layer 22 upon the heat transfer medium. The solution and the heat transfer medium are at an elevated temperature to avoid solidification of the p-dichlorobenzene. Compressor 12 is started, lowering the pressure in the evaporation chamber, and the two liquids begin to boil, forming mixed vapors of water and heat transfer medium which pass to the compressor 12 via outlet 8 and conduit 11. Vapors of p-dichlorobenzene rise from the body 21 and pass into saline solution 22 and are condensed therein to form globules of liquid p-dichlorobenzene which settles back into the body 21 by gravity. About 13 lbs. of p-dichlorobenzene are initially vaporized per pound of water vapor produced, but about 12 lbs. are condensed in the saline solution, so that only about 1 lb. of p-dichlorobenzene per pound of water vapor passes out of the vaporization chamber together with the water vapor.

The vapors are compressed to a pressure corresponding to a rise in vapor condensing temperature of about 10° F. The compressed mixed vapors pass through heat exchanger 9 and are condensed therein, giving up their sensible heat and their latent heat of condensation by indirect heat exchange to the body 21 of liquid heat transfer medium and thence through vaporization and subsequent direct condensation of the heat transfer medium vapors within the body of the salt solution 22 to the saline solution. When the system is in full operation, this heat is sufficient to maintain the continued evaporation of the saline solution by the condensing heat transfer medium vapors.

The condensed water and liquid heat transfer medium pass to separation tank 16, whence the liquid heat transfer medium is returned to the evaporation chamber via inlet 7. Preheated additional liquid heat transfer medium is supplied to the system as needed from tank 17.

Water is recovered which is suitable for industrial purposes. However, the water may be further processed, e.g. by partial distillation, if intended for use as potable water to improve taste and remove ordor. The solubility of p-dichlorobenzene in water is 79 p.p.m. at room temperature, and slightly higher at the evaporating temperature; its high specific gravity of 1.458 assures rapid and complete separation. The interface between the two liquid layers in the evaporator is maintained, but is subject to disruption by bubbles of heat transfer medium vapor which rise through the interface to condense within the body of saline solution, and droplets of condensed heat transfer medium which fall through the interface to be revaporized within the body of the liquid heat transfer medium.

In the hopper there is present liquid heat transfer medium and also possibly some accumulated solid salts which crystallize from the brine as it evaporates. The excess salts crystallize and settle through the layer of heat transfer medium and work their way down into the hopper, whence they can be removed continuously or at intervals, by conventional means. The system can be operated at atmospheric, subatmospheric, or superatmospheric pressure. The saline solution can be concentrated to any desired extent, but a practical limit is the point where its specific gravity approaches that of the heat transfer medium. At this point the brine should be continuously removed and transferred to an additional stage where a heat transfer medium of suitable specific gravity would be used.

The method of the invention has the further advantage of eliminating scale formation on the outer surfaces of the heat exchanger tube 10 in the evaporator and of virtually eliminating corrosion.

The following examples serve to illustrate operating conditions for the process, but are not to be regarded as limiting.

*Example 1*

A run was made on a laboratory scale apparatus, atmospheric pressure, utilizing as an evaporating chamber an inverted bell jar of about 5 gallons capacity equipped with a submerged ⅜" O.D. copper heat exchange coil, having a heating surface of slightly more than 1 sq. ft. A charge of molten p-dichlorobenzene of 1.5 quarts (about 4.5 lbs.) was introduced into the jar, and then an initial charge of 1 quart of sea water, having a total salt content of 3.5%. The two liquids were heated in the jar by a jet of steam to approximately 212° F. The upper portion of the jar was connected via tubing to a compressor, which was a Frigidaire ⅓ H.P. 2 cylinder machine, and the vapors of water and p-dichlorobenzene were drawn off and compressed to a degree corresponding to a temperature rise of about 10° F. Readings were taken on three thermometers extending downward into the vapor, and the two bodies of liquid within the jar. The liquid readings were approximately 212° F. The vapor temperature was about 208° F. The composition of the vapor was 45% p-dichlorobenzene and 55% water, by weight, or about 91% water by volume. The vapors after compression were passed through the submerged heating coil and condensed. After condensation, the two-phase liquid obtained had the same percentage composition by weight. The temperature of the vapor entering the heating coil was 218° F. The pressure in the heating coil was about 18.1 lbs. per sq. in. absolute. As the evaporation was continued, additional sea water was periodically introduced, salts crystallized out and collected at the bottom of the jar.

*Example 2*

Using the same apparatus as described in Example 1, a run was made with sea water and p-dichlorobenzene under vacuum. The vacuum was maintained by a 2-stage oil piston type pump. The pressure in the jar was 4 lbs. per sq. in. absolute, and the vapor temperature was 150° F. The vapors of water and p-dichlorobenzene were compressed to 5.2 lbs. per sq. in. absolute, corresponding to a temperature rise of 10° F. The composition of vapor and condensate was 42.5% p-dichlorobenzene and 57.5% water, by weight.

What is claimed is:
1. Method for the desalinization of aqueous saline solutions comprising the steps of:
 (a) maintaining a body of aqueous saline solution at its evaporation temperature in a vaporization zone in contact with and superimposed upon a body of a relatively volatile liquid heat transfer medium having limited solubility in water and in said saline solution and having a higher specific gravity than said saline solution, the aqueous saline solution being introduced above the said bodies;
 (b) heating and volatilizing said liquid heat transfer medium to form vapors thereof and passing said vapors through said body of aqueous saline solution, in direct heat exchange, whereby said saline solution is heated and boiled, a portion of said heat transfer medium vapor being condensed to liquid and returned to said body of liquid heat transfer medium;
 (c) vaporizing water from said saline solution and collecting water vapor and heat transfer medium vapor as a combined vapor;
 (d) passing said combined vapor through a heat exchange means and in indirect heat exchange with the liquid heat transfer medium to simultaneously condense the water vapor to liquid water and the heat transfer medium vapor to liquid heat transfer medium;
 (e) removing and gravity separating the condensed water and the condensed liquid heat transfer medium; and
 (f) returning the condensed liquid heat transfer medium to said body thereof in said varporization zone above the said bodies, said liquid heat transfer medium being maintained in liquid form when it is returned to said vaporization zone.

2. The method of claim 1 in which said heat transfer medium is a relatively volatile halogenated hydrocarbon.
3. The method of claim 1 in which the heat transfer medium is para-dichlorobenzene.
4. The method of claim 1 in which the heat transfer medium is perchloroethylene.
5. The method of claim 1 in which the saline solution is sea water.
6. The method of claim 1 which includes the further step of recovering solid salts from said saline solution by allowing said salts to crystallize selectively in accordance with their solubilities.

References Cited by the Examiner
UNITED STATES PATENTS

| | | | |
|---|---|---|---|
| 2,314,636 | 4/1943 | Slabkowicz | 260—650 X |
| 2,863,501 | 12/1958 | Farnsworth | 159—24 |
| 2,976,224 | 3/1961 | Gilliland | 203—10 |
| 3,032,482 | 5/1962 | Shoemaker | 203—10 |
| 3,213,001 | 10/1965 | Schmidt | 203—100 |

NORMAN YUDKOFF, *Primary Examiner.*

F. E. DRUMMOND, *Assistant Examiner.*